United States Patent [19]

Jeong

[11] Patent Number: 5,774,507
[45] Date of Patent: Jun. 30, 1998

[54] SYNCHRONOUS CLOCK CONTROLLER FOR DIGITAL EXCHANGE

[75] Inventor: Chang-Rae Jeong, Seoul, Rep. of Korea

[73] Assignee: SamSung Electronics Co., Ltd., Kyungki-do, Rep. of Korea

[21] Appl. No.: 660,940

[22] Filed: Jun. 10, 1996

[30] Foreign Application Priority Data

Jun. 9, 1995 [KR] Rep. of Korea ................. 15236/1995

[51] Int. Cl.$^6$ .................................................. H04L 7/00
[52] U.S. Cl. ......................... 375/354; 370/503; 327/141
[58] Field of Search .................................. 375/354, 362, 375/371, 356; 370/503, 324; 327/144, 141, 145, 162

[56] References Cited

U.S. PATENT DOCUMENTS

| | | | |
|---|---|---|---|
| 4,680,779 | 7/1987 | Wakerly | 375/350 |
| 4,961,188 | 10/1990 | Cooperman et al. | 370/94.2 |
| 5,155,746 | 10/1992 | Fleischer et al. | 375/362 |
| 5,193,089 | 3/1993 | Tsuchida | 370/84 |
| 5,260,978 | 11/1993 | Whitehead | 375/354 |
| 5,268,931 | 12/1993 | Lau | 375/362 |
| 5,373,537 | 12/1994 | Oberhauser et al. | 327/141 |

*Primary Examiner*—T. Ghebretinsae
*Attorney, Agent, or Firm*—Robert E. Bushnell, Esq.

[57] ABSTRACT

A synchronous clock controller for a digital exchange accommodates installation of a plurality of office line cards. A priority encoder encodes priority information signals respectively provided from the office line cards, and generates a selection signal indicating one of the office line cards having a highest priority among the office line cards in dependence upon the priority information signals. A clock selector receives office line clock signals respectively provided from the office line cards, and outputs a selected one of the office line clock signals provided from the office line card indicated by the selection signal. A digital phase synchronizing circuit phase synchronizes the selected office line clock signal with an internal reference clock signal, and generates a reference synchronization clock signal and a bit synchronization clock signal in response to the phase synchronizing.

12 Claims, 3 Drawing Sheets

SYNCHRONOUS CLOCK CONTROLLER FOR DIGITAL EXCHANGE

CROSS-REFERENCE TO RELATED APPLICATIONS

This application makes reference to, incorporates the same herein, and claims all benefits accruing under 35 U.S.C. §119 arising from an application for Synchronous Clock Controller For Digital Exchange earlier filed in the Korean Industrial Property Office on 9 Jun., 1995 and there duly assigned Ser. No. 15236/1995.

BACKGROUND OF THE INVENTION

The present invention relates to a synchronous clock controller for a digital exchange, and more particularly, to a circuit capable of synchronizing a clock source of the digital exchange with an office line clock signal generated from an office line card having the highest order of priority from among a plurality of mounted office line cards.

As communication technology advances, there is a growing trend in the demand for providing integrated services to a multiplicity of users through a digital network. One way in which to provide these services is through a plurality of digital office lines. In providing digital communication, issues regarding clock synchronization are always a major concern. One prior art reference discussing these issues is U.S. Pat. No. 5,155,746 entitled Clock Synchronization Scheme For Digital Transmission issued to Whitehead. In Whitehead '746, a clock synchronization scheme for synchronizing a remote terminal to a distantly located central office terminal is provided. In order to obtain synchronization, the central office terminal repetitively transmits a frame which has in it only one synchronization bit located in a predetermined position. The remote terminal controls the frequency of an oscillator based on the phase and frequency difference between the actual received synchronization bit and the bit position that the terminal says that bit should be received in. While this type of conventional art is useful for synchronizing a remote terminal to a central office terminal, I note that it fails to address the subject of clock synchronization in a digital exchange that accommodates installation of a plurality of office line cards.

SUMMARY OF THE INVENTION

Therefore, it is an object of the present invention to provide a circuit capable of synchronizing a clock source of a main device with an office line clock signal in a digital exchange having a plurality of mounted office line cards.

It is another object to provide a circuit capable of synchronizing a clock source of a main device with an office line clock signal generated from an office line card having the highest order of priority from among a plurality of mounted office line cards.

It is still another object to provide a circuit that assigns priority to a plurality of mounted office line cards based on the locations in which the office line cards are mounted within the slots of a digital exchange.

These and other objects can be achieved in accordance with the principles of the present invention with a synchronous clock controller for a digital exchange having a plurality of office line cards. A priority encoder encodes priority information signals-respectively provided from the office line cards, and generates a selection signal indicating one of the office line cards having a highest priority among the office line cards in dependence upon the priority information signals. A clock selector receives office line clock signals respectively provided from the office line cards, and outputs a selected one of the office line clock signals provided from the office line card indicated by the selection signal. A digital phase synchronizing circuit phase synchronizes the selected office line clock signal with an internal reference clock signal, and generates a reference synchronization clock signal and a bit synchronization clock signal in response to the phase synchronizing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
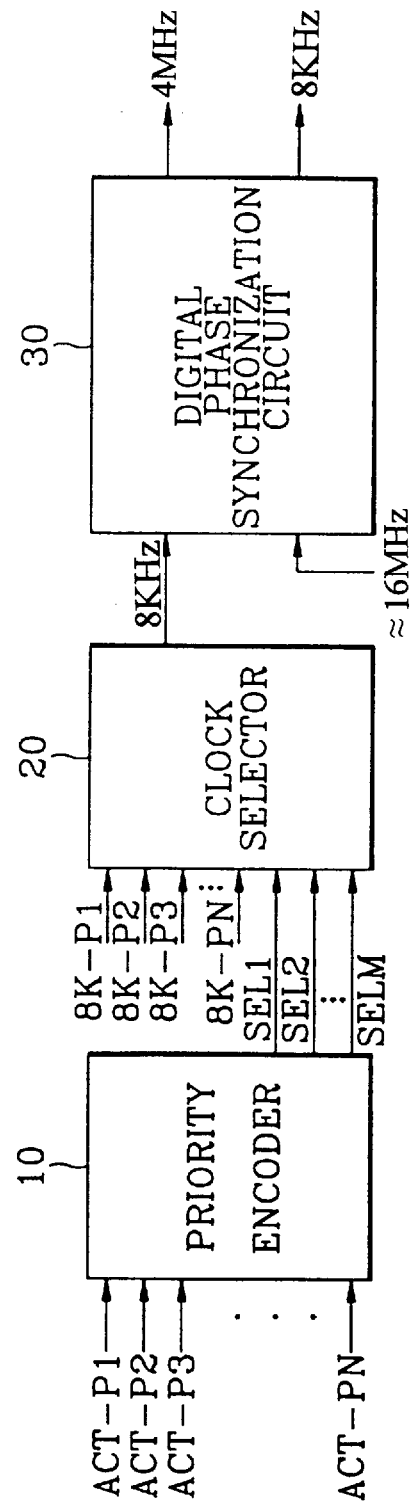
FIG. 1 is a block diagram of a synchronous clock controller for a digital exchange constructed according to the principles of the present invention.
Figure 2:
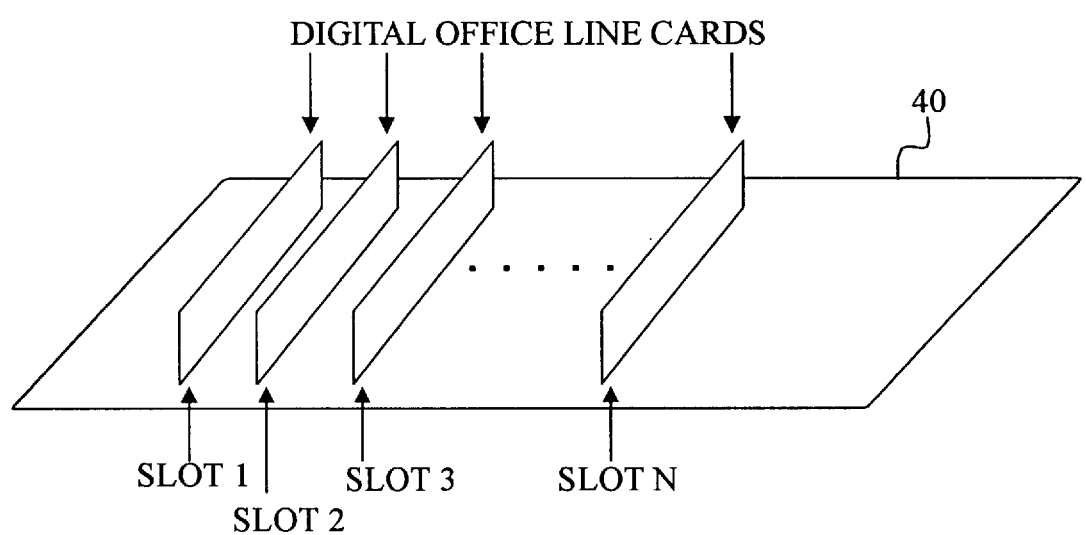
FIG. 2 is a diagram of the mounting arrangement of office line cards according to the principles of the present invention.

Turning now to the drawings and referring to FIG. 1, a block diagram of a synchronous clock controller for a digital exchange constructed according to the principles of the present invention is shown. In FIG. 1, priority information signals ACT-P1~ACT-$P_N$ are generated based on the respective locations of a plurality of office line cards mounted in the digital exchange. Referring to FIG. 2, a diagram of the mounting arrangement of office line cards according to the principles of the present invention is shown. In FIG. 2, assuming that the digital exchange provides a mother board 40 having N slots into which the office line cards can be respectively inserted, the highest order of priority is assigned to the office line card mounted in the leftmost slot (i.e., slot 1). This type of priority designation minimizes the amount of circuitry that is required. Therefore, since the office line card inserted within slot 1 has the highest order of priority, the system clock is synchronized with the clock signal provided from the office line card mounted in slot 1. Accordingly, the office line cards mounted in the slots following slot 1 (i.e., slot 2, slot 3, . . . slot N) are synchronized according to the clock signal from the office line card mounted in slot 1. This priority designation is maintained until an error is generated from slot 1. Moreover, if the system is operated when an office line card is not mounted in slot 1, then the office line card mounted in the slot that is closest to slot 1 is assigned the highest order of priority.

The priority information signals ACT-P1~ACT-$P_N$ provided from the slots indicate the order of priority of the office line cards according to their respective mounting locations within the slots of the digital exchange, and also indicate whether or not any errors are generated from the slots. A priority encoder 10 receives and encodes the priority information signals ACT-P1~ACT-$P_N$, and outputs a selection signal indicating the location of the office line card having the highest order of priority among the office line cards that are mounted within the slots. Accordingly, if office line cards are mounted within all of the slots, then the selection signal output from priority encoder 10 indicates the location of the office line card mounted in slot 1.

A clock selector 20 receives office line clock signals 8K-P1~8K-$P_N$ from the office line cards, and selectively outputs the office line clock signal from the office line card indicated by the selection signal. That is, clock selector 20 selects and outputs the office line clock signal from the office line card having the highest order of priority among the office line cards that are currently mounted within the slots. The office line clock signals each exhibit a frequency of 8 KHz, a period of 125 μsec and a duty ratio of 50 to 50. Clock selector 20 may be constructed as a demultiplexer or a switching circuit.

A digital phase synchronization circuit 30 phase-synchronizes the office line clock signal output from clock selector 20 with an internal reference clock signal, and in response to the phase synchronization operation generates a reference synchronization clock signal and a bit synchronization clock signal for output to a main device. The internal reference clock signal exhibits a frequency of approximately 16 MHz, the reference synchronization clock signal exhibits a frequency of 8 KHz and the bit synchronization clock signal exhibits a frequency of 4 MHz.

Accordingly, the synchronous clock controller of FIG. 1 analyzes the priority information signals ACT-P1 through ACT-$P_N$, and determines the order of priority of the office line cards that are currently mounted within the slots. The office line clock signal generated from the office line card having the highest order of priority is then phase-synchronized with the internal reference clock signal, and the reference synchronization clock signal and bit synchronization clock signal are output to the main device.

Assume that the office line card mounted within slot 2 currently has the highest order of priority. In this situation, if an office line card is then mounted within slot 1, the order of priority shifts to the office line card mounted within slot 1. In this same situation, however, if an office line card is then mounted within slot 3, instead of slot 1, there is no change in the order of priority. The priority changes according to the mounting of office line cards because an activation signal is not generated when no office lines are used with an S-interface TRK (i.e., for a central office line), unlike a T1 or an E1 office line interface, in which the activation signal is continuously generated regardless of whether or not any office line card is connected.

Figure 3:
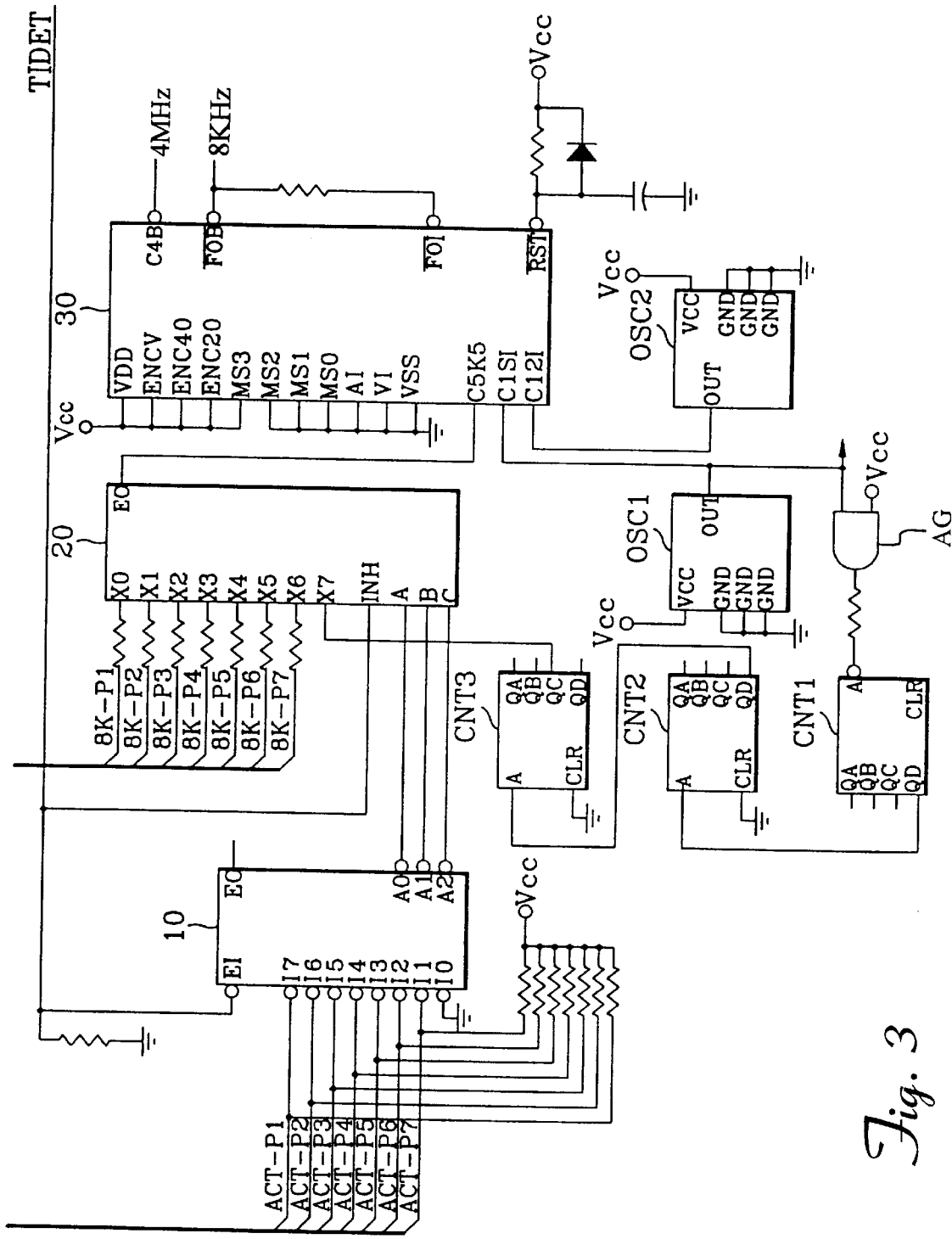
FIG. 3 is a detailed circuit diagram of the synchronous clock controller shown in FIG. 1.

FIG. 3 is a detailed circuit diagram of the synchronous clock controller shown in FIG. 1. In FIG. 3, it is assumed that seven (7) office line cards are mounted within the digital exchange. Priority encoder 10 is preferably embodied using a 74HC148 chip, clock selector 20 is preferably embodied using a 74HC4051 chip, and digital phase synchronization circuit 30 is preferably embodied using a MT8941 chip. All of these chips are well-known, commercially available components. Moreover, the terminal designations for these chips are conventional, and will not be discussed for the sake of brevity.

In FIG. 3, counters CNT1~CNT3 are provided for generating an 8 KHz clock signal that is used in situations where no office line cards are mounted within the slots. An AND gate AG forms a path for the internal reference clock signal generated by an oscillator OSC1. The internal reference clock signal generated by oscillator OSC1 preferably exhibits a frequency of 16.384 MHz. In addition, when a T1 interface is used, each of the office line cards should use a frequency of 1.544 MHz, and digital phase synchronization circuit 30 generates the frequency of 1.544 MHz using signals generated from oscillator OSC1 and an oscillator OSC2.

During the operation of the circuit shown in FIG. 3, priority encoder 10 receives and encodes the priority information signals ACT-P1~ACT-$P_N$, and outputs the selection signal from terminals A0–A2 indicating the location of the office line card having the highest order of priority among the mounted office line cards. Accordingly, when all of the slots contain an office line card, the selection signal output from priority encoder 10 indicates the location of the office line card mounted in the leftmost slot of FIG. 2. Alternatively, when no office line card is mounted, priority encoder 10 outputs the selection signal to select the output provided from counter CNT3.

Clock selector 20 receives both the office line clock signals 8K-P1~8K-P7 respectively generated from the mounted office line cards and the output of counter CNT3, and selects either the office line clock signal output from the office line card having priority, or the output of counter CNT3 in accordance with the selection signal provided from priority encoder 10. That is, clock selector 20 selectively outputs the office line clock signal from the office line card having the highest order of priority when at least one office line card is currently mounted. Alternatively, when no office line card is currently mounted within the slots, clock selector 20 selects the output of counter CNT3. Digital phase synchronization circuit 30 then phase-synchronizes the output provided from clock selector 20 with the internal reference clock signal generated by either oscillator OSC1 or oscillator OSC2, and generates the reference synchronization clock signal and the bit synchronization clock signal for output to the main device. When an E1 interface is used, the internal reference clock signal generated in oscillator OSC1 and having a frequency of 16.384 MHz is used. On the other hand, when a T1 interface is used, the internal reference clock signal generated in oscillator OSC2 and having a frequency of 12.352 MHz is used.

Also in FIG. 3, when an older version of a digital TRK board is utilized, a 4 MHz signal and a TIDET signal are utilized in place of the 8 KHz office line clock signal and the ACT priority information signal. When the TIDET signal is in a logical high state, this indicates that the digital TRK board is in a normal state of operation and all logic signals normally generated in FIG. 3 are disabled. That is, when the TIDET exhibits a logical high state, priority encoder 10, clock selector 20 and digital phase synchronization circuit 30 are disabled. During this operation, a 4 MHz signal and an 8 KHz signal generated in the digital TRK board are utilized in place of the 4 MHz and 8 KHz signals normallt output from digital phase synchronization circuit 30.

As mentioned above, when a plurality of office line cards are mounted in the slots of a digital exchange, the clock source of a main device can be synchronized in accordance with the office line clock signal generated from the office line card having the highest order of priority among the mounted office line cards.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A synchronous clock controller for a digital exchange having a plurality of office line cards, comprising:

a priority encoder for encoding priority information signals respectively provided from said office line cards, and generating a selection signal indicating one of said office line cards having a highest priority among said office line cards in dependence upon said priority information signals;

means for receiving office line clock signals respectively provided from said office line cards, and outputting a selected one of said office line clock signals provided from said office line card indicated by said selection signal; and means for phase synchronizing said selected office line clock signal with an internal reference clock signal, and generating a reference synchronization clock signal and a bit synchronization clock signal in response to said phase synchronizing.

2. The synchronous clock controller as claimed in claim 1, wherein said priority information signals indicate priority among said office line cards in dependence upon locations of board slots in which said office line cards are inserted.

3. The synchronous clock controller as claimed in claim 1, wherein said reference synchronization clock signal exhibits a frequency of 8 KHz and said bit synchronization clock signal exhibits a frequency of 4 MHz.

4. The synchronous clock controller as claimed in claim 2, wherein said reference synchronization clock signal exhibits a frequency of 8 KHz and said bit synchronization clock signal exhibits a frequency of 4 MHz.

5. A synchronous clock controller for a digital exchange accommodating installation of a plurality of office line cards, comprising:

a priority encoder for encoding priority information signals respectively provided from said office line cards, and generating a first selection signal indicating one of said office line cards having a highest order of priority among said office line cards in dependence upon said priority information signals when at least one of said office line cards is installed, and generating a second selection signal when said office line cards are not installed;

means for generating an independent clock signal in dependence upon an internal reference clock signal;

means for receiving one or more office line clock signals respectively provided from said office line cards when at least one of said office line cards is installed, and further receiving said independent clock signal, and outputting a selected one of said office line clock signals or said independent clock signal in dependence upon one of said first and second selection signals; and means for digitally phase synchronizing said selected office line clock signal or said independent clock signal with said internal reference clock signal, generating a reference synchronization clock signal and a bit synchronization clock signal in response to said phase synchronizing, and outputting said reference synchronization clock signal and said bit synchronization clock signal as a reference clock source for said digital exchange.

6. The synchronous clock controller as claimed in claim 5, wherein said priority information signals indicate priority among said office line cards in dependence upon locations of board slots in which said office line cards are installed.

7. The synchronous clock controller as claimed in claim 5, wherein said reference synchronization clock signal exhibits a frequency of 8 KHz and said bit synchronization clock signal exhibits a frequency of 4 MHz.

8. The synchronous clock controller as claimed in claim 6, wherein said reference synchronization clock signal exhibits a frequency of 8 KHz and said bit synchronization clock signal exhibits a frequency of 4 MHz.

9. A method for controlling clock signals in a digital exchange having a plurality of office line cards, comprising the steps of:

encoding priority information signals respectively provided from said office line cards, and generating a selection signal indicating one of said office line cards having a highest priority among said office line cards in dependence upon said priority information signals;

receiving office line clock signals respectively provided from said office line cards, and outputting a selected one of said office line clock signals provided from said office line card indicated by said selection signal; and phase synchronizing said selected office line clock signal with an internal reference clock signal, and generating a reference synchronization clock signal and a bit synchronization clock signal in response to said phase synchronizing.

10. The method as claimed in claim 9, wherein said priority information signals indicate priority among said office line cards in dependence upon locations of board slots in which said office line cards are inserted.

11. The method as claimed in claim 9, wherein said reference synchronization clock signal exhibits a frequency of 8 KHz and said bit synchronization clock signal exhibits a frequency of 4 MHz.

12. The method as claimed in claim 10, wherein said reference synchronization clock signal exhibits a frequency of 8 KHz and said bit synchronization clock signal exhibits a frequency of 4 MHz.

* * * * *